Dec. 20, 1966     D. D. BOYD     3,293,396
TILT RESPONSIVE SWITCH
Filed Oct. 11, 1965
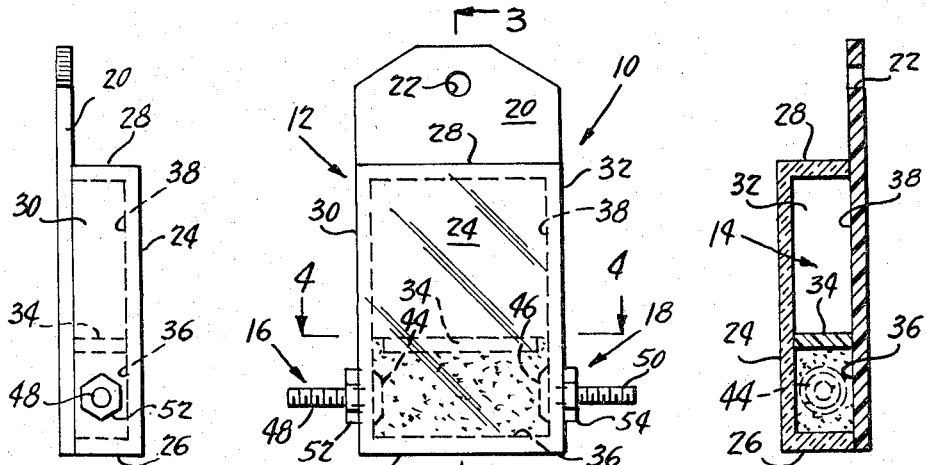
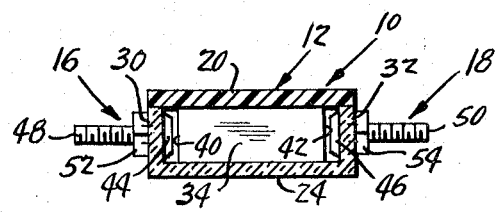
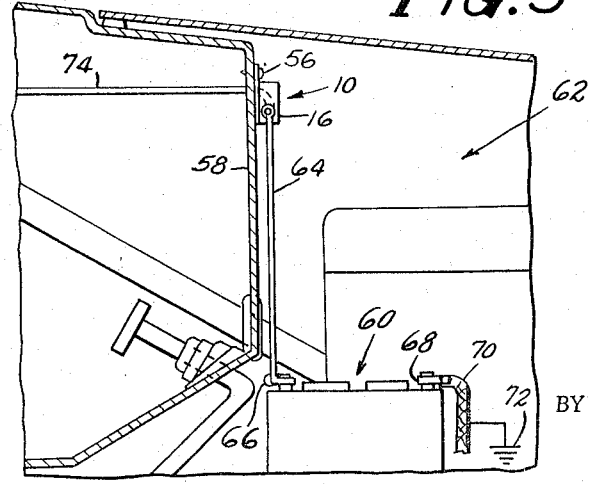
INVENTOR.
DEWEY D. BOYD
BY *Kimmel, Crowell & Weaver*
ATTORNEYS.

United States Patent Office 3,293,396
Patented Dec. 20, 1966

3,293,396
TILT RESPONSIVE SWITCH
Dewey D. Boyd, 3813 Donna Circle,
North Highland, Calif. 95660
Filed Oct. 11, 1965, Ser. No. 494,707
1 Claim. (Cl. 200—152)

This invention relates to a mercury switch, and more particularly to a switch which may be operatively connected in an electrical circuit of a vehicle to cut off or deenergize the circuit when the vehicle turns over or turns on its side.

It is known in the prior art to provide a mercury switch associated with an automobile for the general purposes mentioned above, but there are various difficulties attending such devices. The conventional cut off switch includes a body of fluid electrically connecting a pair of spaced apart electrical contacts such that a tipping over of the vehicle results in the gravitational flow of the electrically conductive fluid to break the electrical circuit of the vehicle. A common difficulty in devices of this type is the movement of the fluid because of quick starts, stops or turns resulting in movement of the fluid because of inertial or centrifugal forces. Some of the devices of the prior art include various arrangements for obviating the movement of fluid because of inertial or centrifugal forces, but these devices are characterized by an unnecessary complexity resulting in high construction costs and possibilities of failure.

It is an object of the instant invention to provide a gravity actuated mercury switch for severing the electrical circuit of a vehicle when it is tipped or overturned.

Another object of the instant invention is to provide a mercury cut off switch which is simple to construct, easy to install, and infallible in operation.

A more specific object of the instant invention is to provide a plurality of compartments, one of which contains an electrically conductive fluid in communication with a pair of spaced apart conduits with at least one passageway allowing the liquid to drain into another compartment when the vehicle is overturned thus severing the electrical circuit across the aforementioned electrical contacts.

Another object of the instant invention is to provide a vehicle equipped with a cut off switch of the type previously mentioned.

Other objects and advantages of the instant invention, as well as the invention itself, reside in the combinations of elements, arrangements of parts, and features of construction and operation, all as will be more fully pointed out hereinafter and disclosed in the accompanying drawing wherein there is shown a preferred embodiment of this inventive concept.

In the drawing:

FIGURE 1 is a front elevational view of the device of the instant invention;

FIGURE 2 is a side elevational view of the device of FIGURE 1;

FIGURE 3 is a vertical cross sectional view taken substantially along line 3—3 of FIGURE 1 viewing in the direction of the arrows;

FIGURE 4 is a horizontal cross sectional view of the device of FIGURES 1 to 3 inclusive, taken substantially along line 4—4 of FIGURE 1 viewing in the direction of the arrows illustrating one form of separation member;

FIGURE 5 is a horizontal cross sectional view similar to that of FIGURE 4 showing another form of separation member; and FIGURE 6 is a partial view of a vehicle equipped with the mercury cut off switch of FIGURES 1 to 4 inclusive.

Referring now to the drawing in detail, wherein like reference characters designate like elements throughout the several views thereof, and particularly to FIGURES 1 to 4 inclusive, there is indicated generally at 10 a cut off switch having as its major components a housing designated generally at 12 forming an enlarged elongate compartment denominated generally at 14 receiving therein a pair of electrical contacts shown generally at 16, 18.

Housing 12 includes a rear wall 20 forming at least one opening 22 for receiving a metal screw or the like in order to rigidly secure cut off switch 10 onto a portion of a vehicle such as a fire wall as will be more fully explained hereinafter. Frame 12 includes a transparent front wall preferably of glass or the like 24 spaced from rear wall 20 and joined thereto by a common wall 26, a top wall 28, and a pair of side walls 30, 32. Housing 12 must be made of a dielectric or nonconductive material and fixedly receives a partition member 34 dividing compartment 14 into a first enclosure 36 completely filled with an electrically conductive fluid, such as mercury, and a second enclosure 38 substantially free from such fluid. Partition member 34 forms, in conjunction with housing 12, a pair of passageways 40, 42 providing communication between first and second enclosures 36, 38. It should be apparent, however, that passageways 40, 42 may be formed within the boundaries of partition member 34.

Electrical contacts 16, 18 may be of any suitable type but are illustrated as having a metallic head 44, 46 positioned within first enclosure 36 having a threaded shank 48, 50 extending outwardly through side walls 30, 32. A suitable threaded nut 52, 54 is received on shanks 48, 50 securing electrical contacts 16, 18 to housing 12 providing electrical communication through cut off switch 10 when an electrically conductive fluid is within first enclosure 36.

As may be seen in FIGURE 6, cut off switch 10 is rigidly mounted by a frictional fastener 56 onto a fire wall 58 of a vehicle, although switch 10 may be mounted at any suitable location. A battery shown generally at 60 is provided within an engine compartment designated generally at 62 with a wire 64 connecting a first terminal 66 of battery 60 to electrical contact 16 of switch 10. A second terminal 68 of battery 60 is connected by a wire 70 to a conventional ground 72. An electrical conduit 74 connects electrical contact 18 with the ignition (not shown) of the vehicle of FIGURE 6.

It has been found that the inertial forces produced by abrupt starts and particularly by abrupt stops are greater than the centrifugal forces resulting from turns. Accordingly, cut off switch 10 is positioned such that passageways 40, 42 are disposed transversely with respect to the vehicle such that only a small portion thereof is available for liquid movement during rapid starts and stops. When a vehicle equipped with cut off switch 12 is tipped or turned over, electrically conductive liquid within first enclosure 36 will drain through either or both of passageways 40, 42 into second enclosure 38. When sufficient liquid is drained out, one of metallic heads 44, 46 will not be covered by the liquid surface thereby severing the electrical circuit between contacts 16, 18 thus reducing fire hazards as a result of accidents.

An alternate form of cut off switch is indicated generally at 76 in FIGURE 5, with like reference characters being used to designate identical parts existing in switch 10 for purposes of brevity. A separation member 78 is fixedly received interiorly of frame 12 to form first and second enclosures 36, 38 with a pair of arcuate substantially semi-circular passageways 80, 82 being formed at the lateral ends of separation member 78. Since passageways 80, 82 are of lesser extent than the lateral ends of separation member 78, it will be apparent that rapid starts and stops will create relatively little liquid flow through passageways 80, 82.

It is now seen that there is herein provided an improved mercury switch having all of the objects of this invention and others, including many advantages of great practical utility and commercial importance.

Since many embodiments may be made of the instant inventive concept, and since many modifications may be made of the embodiments hereinbefore shown and described, it is to be understood that the foregoing is to be interpreted merely as illustrative and not in a limiting sense.

I claim:

In combination with a motor vehicle having an electrical system including a hot line extending from a battery and electrical apparatus operable through said hot line, a tilt responsive switch comprising a plate-like substantially rectangular rear wall of dielectric material having means adjacent the top thereof adapted for attachment to the fire wall of the motor vehicle, a housing comprised of transparent dielectric material rigidly affixed to said rear wall, and including a bottom wall, side walls, a front wall and a top wall, said side and bottom walls coinciding with the side and bottom edges of said rear wall, said top wall being positioned below said means adapted for attachment to the fire wall, a pair of aligned oppositely disposed electrical contact members, one extending through each side wall immediately adjacent said bottom wall, a dielectric partition in said housing secured to said front and rear walls but terminating short of each side wall to define a pair of restricted openings at each end of said partition, one immediately above each contact member, said contact members being adapted to be connected in the hot line of the vehicle between the battery and the apparatus operated thereby, and mercury normally filling the lower part of said housing to the bottom of the openings at each end of said partition normally providing a conductive electrical path between said contact members, said mercury escaping through one of said restricted openings upon excessive tilting of the vehicle to break the circuit through the hot line and deenergize all electrical apparatus.

References Cited by the Examiner
UNITED STATES PATENTS 2,192,262 3/1940 Griesedieck _____ 200—152 X
2,912,534 11/1959 Rowell et al. _____ 200—61.47

ROBERT K. SCHAEFER, *Primary Examiner.*

H. HOHAUSER, *Assistant Examiner.*